(12) United States Patent
Jones et al.

(10) Patent No.: US 7,682,411 B2
(45) Date of Patent: *Mar. 23, 2010

(54) PORTABLE HYDROGEN SOURCE (75) Inventors: Peter Brian Jones, Sailsbury (GB); Darren Jonathan Browning, Gosport (GB); Gary Owens Mepsted, Gosport (GB); Darren Paul Scattergood, Gosport (GB)

(73) Assignee: Qinetiq Limited (GB)

( * ) Notice: Subject to any disclaimer, the term of this patent is extended or adjusted under 35 U.S.C. 154(b) by 238 days.

This patent is subject to a terminal disclaimer.

(21) Appl. No.: 11/829,252

(22) Filed: Jul. 27, 2007

(65) Prior Publication Data

US 2007/0277436 A1 Dec. 6, 2007

Related U.S. Application Data (63) Continuation of application No. 10/362,120, filed as application No. PCT/GB01/03756 on Aug. 21, 2001, now Pat. No. 7,261,748.

(30) Foreign Application Priority Data

Sep. 1, 2000 (GB) .................................. 0021386.8

(51) Int. Cl.
*B01J 7/00* (2006.01)

(52) U.S. Cl. ........................ 48/61; 48/63; 48/64; 48/65; 48/127; 48/197; 48/206; 48/62; 422/211; 422/239; 422/111; 422/129; 62/48; 149/22; 149/36; 149/46; 423/648; 423/656; 252/188

(58) Field of Classification Search ...................... 48/61, 48/63–65; 423/648.1, 656; 422/211, 239

See application file for complete search history.

(56) References Cited

U.S. PATENT DOCUMENTS

| 3,419,361 A | 12/1968 | Francis et al. |
| 4,157,927 A | 6/1979 | Chew et al. |
| 4,270,360 A | 6/1981 | Nakane et al. |
| 4,315,786 A | 2/1982 | English et al. |
| 4,468,263 A | 8/1984 | Artz et al. |
| 5,037,518 A | 8/1991 | Young et al. |
| 5,702,491 A | 12/1997 | Long et al. |
| 5,817,157 A | 10/1998 | Checketts |
| 6,274,093 B1 | 8/2001 | Long et al. |

FOREIGN PATENT DOCUMENTS

GB 2165532 4/1986

*Primary Examiner*—Alexa D. Neckel
*Assistant Examiner*—Kaity V. Handal
(74) *Attorney, Agent, or Firm*—McDonnell Boehnen Hulbert & Berghoff LLP (57) ABSTRACT A man portable hydrogen source, the source comprising one or more hydrogen generating elements, an ignition control system and a pressure vessel. Each hydrogen generating element comprises a pellet holder provided with one or more recesses and a thermal insulation layer to reduce heat transfer to adjacent hydrogen generating elements; wherein at least one recess contains a pellet of a chemical mixture which on thermal decomposition evolves hydrogen gas; wherein the ignition control system comprises one or more igniters, associated with an individual pellet, and activation means to activate the igniters; and wherein the evolved hydrogen and hydrogen generating elements are contained within the pressure vessel.

26 Claims, 7 Drawing Sheets

Thermal decomposition of ammonia borane (NH₃BH₃)

Fig.11.

Thermal decomposition of NH₃BH₃ using LiAlH4/NH4Cl heat mix

PORTABLE HYDROGEN SOURCE

This application is a continuation of co-pending application Ser. No. 10/362,120 filed on Feb. 20, 2003 which issued on Aug. 28, 2007 as U.S. Pat. No. 7,261,748, which application is a 371 application of PCT/GB01/03756 filed on Aug. 21, 2001, which in turn claims priority to UK0021386.8 filed on Sep. 1, 2000.

BACKGROUND OF THE INVENTION (1) Field of the Invention

This invention relates to a hydrogen source, more specifically to a self contained hydrogen source, which source is particularly suitable for use in man portable applications, such as, for example, fuel cell systems. The source can, however, be used in other systems that require hydrogen on demand, such as larger fuel cells, hydrogen engines or gas chromatographs.

(2) Description of Related Art

The lack of availability of a practical, high density fuel source has prevented more widespread usage of hydrogen powered fuel cell systems. Conventionally, hydrogen is stored under high pressure as a gas in a bottle or cylinder which, due to the requirements for adequate strength of containment, mean that the amount of hydrogen stored is only of the order of 2% by weight. Hydrogen can also be stored as a liquid, however it has an extremely low boiling point of ca. 20 K. so requires cryogenic containment. This again, adds bulk and weight.

An alternative to storage is in-situ hydrogen generation. Hydrogen generating systems fall into two broad classes: the generation of hydrogen from liquid or gaseous hydrocarbons, usually referred to as reformation; and hydrogen generation by the decomposition of hydrogen containing compounds. The amount of hydrogen available by weight for most in-situ hydrogen generating systems is no greater than that obtainable from a compressed gas source.

Reformation systems are not suitable for man portable applications as they are generally large and heavy due to the equipment needed for thermal management. Furthermore, the purity of hydrogen produced is low requiring subsequent clean up reactions prior to fuel cell usage.

The decomposition of hydrogen containing compounds can be further categorized; firstly, decomposition in the presence of water, referred to as hydrolysis, and secondly, decomposition by heat, or thermolysis. Both of these methods have been investigated. A reactor for the hydrolysis of metal hydrides is the subject of U.S. Pat. No. 5,702,491. Although able to produce hydrogen, this system suffers from difficulties associated with control of the hydrolysis reaction and a low hydrogen yield, with respect to the weight of the system, due to the amount of water required.

Thermal decomposition of chemical hydrides such as amine boranes, and metal borohydrides have been investigated as means for generating hydrogen. Previous patents have described the decomposition of these compounds to produce hydrogen in a 'one shot' non-controllable reactor (U.S. Pat. Nos. 4,315,786, 4,157,927, 4,468,263) for use with high energy chemical lasers.

BRIEF SUMMARY OF THE INVENTION

The present invention provides a hydrogen source comprising one or more hydrogen generating elements arranged in a pressure vessel and an ignition control system associated with the hydrogen generating element(s), wherein the one or more hydrogen generating elements comprise a plurality of pellets of a chemical mixture that on thermal decomposition evolve hydrogen gas, and wherein the ignition control system is arranged to control the rate of ignition of the pellets.

The invention provides a hydrogen generator that utilizes the thermal decomposition of a chemical mixture to generate hydrogen in a controllable manner. The arrangement of the pellets and ignition control system enables the times at which the respective pellets are ignited to be varied, rather than simultaneous ignition of all the pellets taking place. The source is therefore especially suitable for use in a fuel cell, where the generation of hydrogen needs to be controllable and load responsive.

The present invention is also able to provide a low weight hydrogen source, the amount of hydrogen available by weight being greater than that obtainable from traditional prior art sources. It is thus particularly suitable for man portable applications and will, in any case, usually take the form of a self-contained system.

The plurality of pellets may be provided in a single hydrogen generating element or in a plurality of such elements, in which case each element could contain a single pellet. The ignition control system will normally comprise activators and igniters arranged to ignite the pellets on an individual basis and the pellets will be sufficiently spaced or separated from one another to prevent cross-ignition. One or more igniters may be associated with each individual pellet, to permit successive or simultaneous ignition of individual pellets in a controllable and load responsive manner.

Initially the hydrogen may be contained in the pressure vessel. The hydrogen source preferably comprises a regulator to control the flow of evolved hydrogen out from the pressure vessel, usually through a single outlet.

Preferably, the hydrogen source further comprises a filter to purify the hydrogen, prior to it being supplied to external equipment.

The regulator and/or the filter may be external to the pressure vessel, but preferably, the regulator and/or the filter are integrated within the pressure vessel, as this allows for a more compact design. Suitable filters include activated carbon filters, porous stainless steel filters, sintered metal filters or similar known filter materials.

Each hydrogen generating element preferably comprises a pellet holder provided with one or more recesses, the pellets ideally being placed individually in separate recesses. Conveniently, the pellet holder comprises a rigid, porous, high temperature resistant material, which may be machined to shape, but is preferably vacuum formed. Suitable materials include ceramics, such as alumina and zirconia, or other solid materials with low thermal conductivities. Where a plurality of pellet holders are provided, for example, arranged side-by-side, one or more of the pellet holders may be provided with passages or channels to permit passage of the hydrogen through the pressure vessel.

Preferably, at least one, and ideally, each hydrogen generating element further comprises a gas handling layer provided with channels arranged to direct the flow of evolved hydrogen. Preferably, the gas handling layer comprises a metallic layer arranged to contact the inner surface of the pressure vessel. This allows the heat generated during use to be conducted quickly to the exterior of the pressure vessel thereby reducing the temperature within the pressure vessel. The layer may be made from aluminium, stainless steel, titanium or other suitable material.

Advantageously, thermal insulation is provided within the pressure vessel to reduce heat transfer from the one or more hydrogen generating elements. Preferably, the thermal insulation will be provided as a layer and a layer of felt is especially preferred. However, any suitable insulation material such as a ceramic, asbestos or rockwool could be used. Such insulation should be capable of substantially reducing the transfer of heat between any adjacent hydrogen generating elements, so as to prevent cross-ignition.

Preferably, the igniters comprise heated resistance wires or pyrotechnic igniters, although any other similar suitable ignition sources may be used. The igniters may be embedded in the pellets to optimise the heat transfer to the pellets. Usually, however, it is sufficient to place the igniters close to, or in contact with, the pellets.

Preferably, the ignition control system comprises activation means to activate the igniters, which means may comprise, for example, a battery, an electrochemical cell, a fuel cell, a capacitor or a power supply.

Advantageously, the ignition control system further comprises a pressure transducer or other pressure measuring device to determine the pressure of hydrogen within the pressure vessel. The output from the pressure transducer can be used to trigger the decomposition of the pellets in order to maintain the pressure of hydrogen at a pre-set level or, where the apparatus is load responsive, in response to demand from external equipment. This feedback system, when coupled with the regulator, can provide a constant hydrogen pressure to external equipment and can cope with demand from zero to its rated output.

Preferably, the activation of the igniters is prevented if the output from the pressure transducer indicates that the pressure within the pressure vessel is above a safe limit.

Preferably, the ignition control system further comprises a temperature probe to determine the temperature within the pressure vessel. Preferably, the activation of the igniters is prevented if the output from the temperature probe indicates that the temperature within the pressure vessel is above a safe limit.

The hydrogen source may be a single use disposable device or may be re-usable. For example, the pressure vessel may be adapted to be rechargeable with replacement pellets by being formed from two detachably coupled members that may be readily re-assembled, once recharged.

In a preferred embodiment, at least one pellet comprises a first layer or portion of a hydrogen generating mixture, and a second, usually smaller, layer or portion comprising a heat generating mixture that is capable of being ignited by the ignition control system. The heat generating mixture may merely generate heat or may also generate hydrogen as well. In a further embodiment, both types of heat generating mixtures may be present as separate portions or layers. A smaller portion or layer of a readily ignitable, pure heat generating mixture may assist in the ignition of a larger, adjacent portion of a heat and hydrogen generating mixture.

The present invention further provides equipment, in particular, portable equipment, comprising a hydrogen source as described above. For example, the hydrogen source may be employed in a fuel cell system, with the gas being supplied at a pressure suitable for fuel cell operation.

In a further aspect of the present invention there is provided a hydrogen source comprising at least one hydrogen generating element, an ignition control system and a pressure vessel, wherein the hydrogen generating element is contained within the pressure vessel and comprises a pellet holder provided with one or more recesses, wherein at least one recess contains a pellet of a chemical mixture that on thermal decomposition evolves hydrogen gas, and wherein the ignition control system is arranged to control the ignition of the one or more pellets.

In an additional aspect, there is provided a man portable hydrogen source comprising one or more hydrogen generating elements, an ignition control system and a pressure vessel; wherein each hydrogen generating element comprises a pellet holder provided with one or more recesses and a thermal insulation layer to reduce heat transfer to adjacent hydrogen generating elements; wherein at least one recess contains a pellet of a chemical mixture which on thermal decomposition evolves hydrogen gas; wherein the ignition control system comprises one or more igniters, associated with an individual pellet, and activation means to activate the igniters; and wherein the evolved hydrogen and hydrogen generating elements are contained within the pressure vessel.

BRIEF DESCRIPTION OF THE SEVERAL VIEWS OF THE DRAWINGS

The invention will now be described, by way of example only, with reference to the following drawings in which.

DETAILED DESCRIPTION OF THE INVENTION

Figure 1:
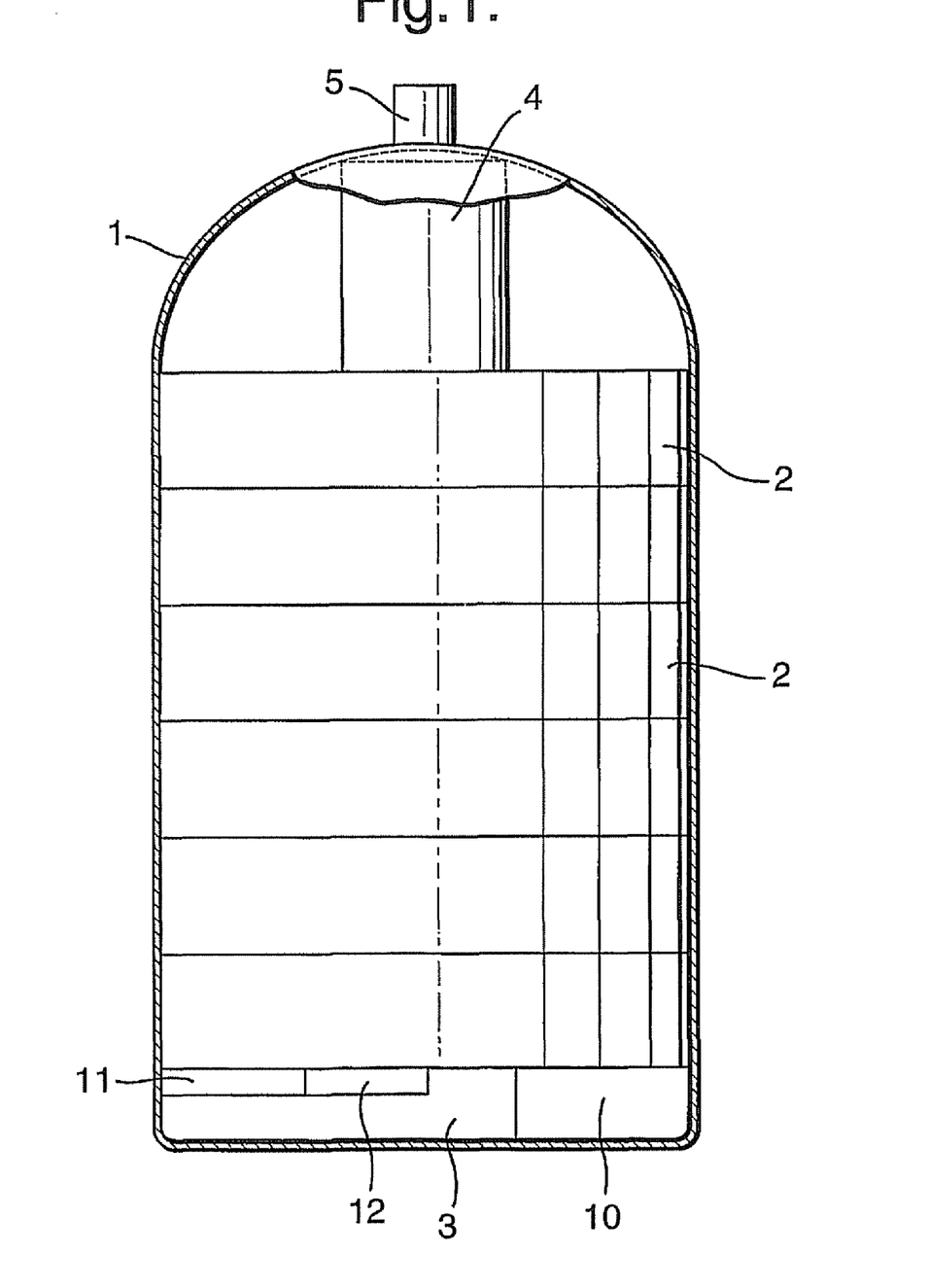
FIG. 1 is a cross section of a man portable hydrogen source in accordance with the present invention.

FIG. 1 illustrates an example of a hydrogen source according to the invention. The source comprises a pressure vessel 1 fabricated from steel. In this example the shape of the vessel is such that its resistance to rupture is high so that it can be manufactured from thin and lightweight steel sheet. Within the pressure vessel there are a plurality of hydrogen generating elements 2 shown in more detail in FIG. 2. The source also includes an activated carbon filter 4 to remove impurities from the evolved gas and a gas regulator 5. In the base of the vessel there is an integrated circuit 3 and a battery 10, a pressure transducer 11 and a temperature probe 12.

Figure 2:
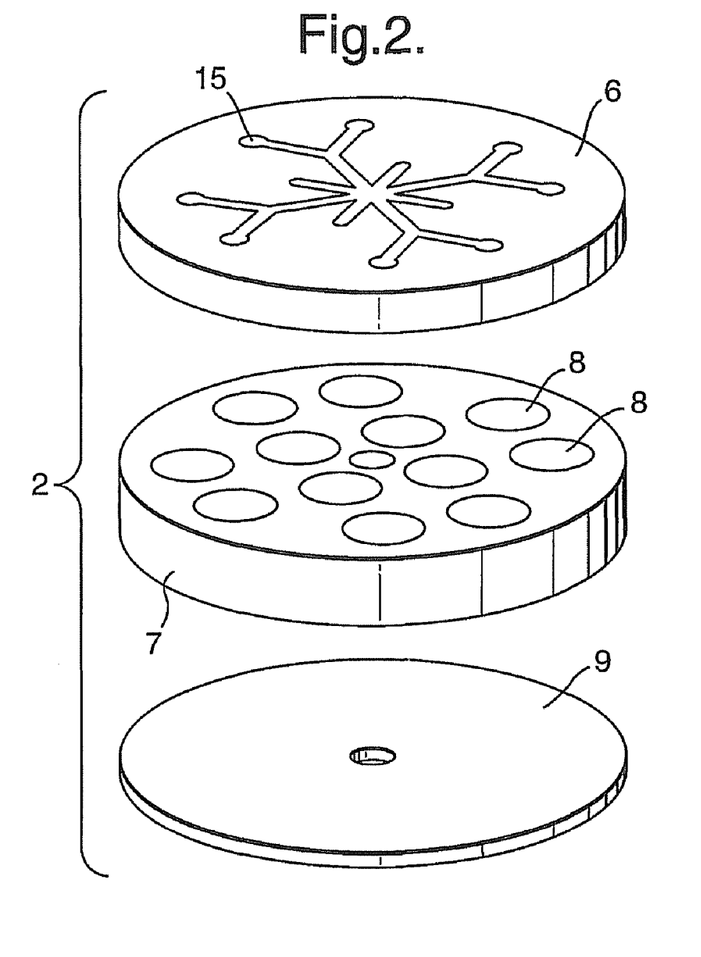
FIG. 2 is an exploded view of a single hydrogen generating element for use in the hydrogen source of FIG. 1 showing the active components.

Each hydrogen generating element 2 comprises three discrete layers; a pellet holder 7, a gas handling layer 6 and a thermal insulation layer 9. The pellet holder 7 has a plurality of recesses into each of which is placed a pellet 8. In this example, the pellet holder is formed from a machinable ceramic which becomes rigid when fired. The porosity of the ceramic, which affects the gas flow characteristics, can be controlled by the application and firing of several coats of rigidiser or ceramic adhesive. An alternative pellet holder may be manufactured by vacuum forming. This method is particularly suited to mass production. Although the recesses in the pellet holder shown in FIG. 2 are of similar size, this is not intended to be limiting. It may be advantageous to provide different sized pellets within the same element or in different elements of the same hydrogen source in order to meet a particular hydrogen demand.

An important advantage of the described embodiment is that each pellet is addressed individually, and this allows the generation of hydrogen to be carefully controlled. In situations where only a low flow rate of hydrogen is needed it may be sufficient to ignite one pellet at a time and to wait until that pellet has fully decomposed before igniting a further pellet. Conversely, if a high flow rate of hydrogen is required, several pellets can be ignited in rapid succession, or even simultaneously. Furthermore, the present embodiment allows the supply of hydrogen to be switched on and off as required. This is in contrast to other hydrogen generators which are often 'one shot' devices and, once activated, produce hydrogen continuously until exhausted. Thus, the arrangement provides a hydrogen generator that is controllable, load responsive and capable of supplying gas at a pressure suitable for fuel cell operation.

Figure 3:
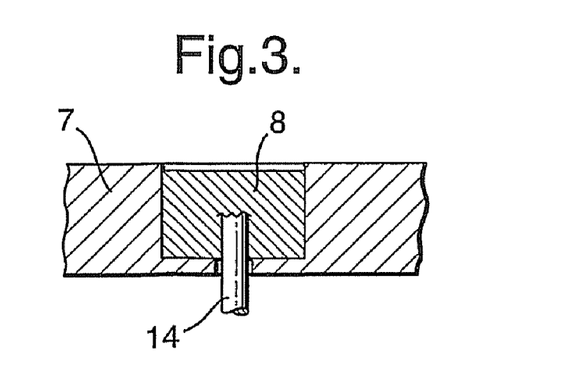
FIG. 3 is a cross section through a pellet of a hydrogen evolving chemical mixture showing the placement of the igniter in the element of FIG. 2.

Pellet ignition is shown in more detail in FIG. 3. An igniter 14 is fed through a small hole in the pellet holder 7 and into the pellet 8. Suitable igniters include heated resistance wires and pyrotechnic igniters. These may be placed adjacent to the surface of the pellet as an alternative to incorporating them within the pellet. The recesses in the pellet holder 7 are spaced so that there is a sufficient thickness of ceramic between each pellet to prevent cross ignition.

The gas handling layer 6 comprises an aluminium sheet into which are formed channels 15. This layer fits closely over the pellet holder 7 so that the channels coincide with the recesses containing the pellets 8. The layer 6 is also designed to fit tightly against the inner surface of the pressure vessel 1 in order to conduct heat to the surroundings. Any suitable thermal conductor could be used as an alternative to the aluminium used in this example.

The thermal insulation layer 9 comprises a felt layer, the purpose of which is to prevent or substantially reduce the transfer of heat between adjacent hydrogen generating elements 2. The example shows only one insulation layer, however several layers of any suitable insulation material may be employed as required.

To generate hydrogen, a circuit 3 is used to address each pellet and, in this example, a battery 10 is used to supply power to activate the igniters 14. Power may be supplied to the igniters from the power supply using wires routed through the centre of the vessel, or by any convenient route. The igniter initiates a thermal decomposition in the pellet 8 which evolves hydrogen gas. In this example the pellets comprise a mixture of $NH_3BH_3$ and $N_2H_4(BH_3)_2$. The compounds, ammonia borane, $NH_3BH_3$ and hydrazine bis-borane, $N_2H_4(BH_3)_2$ contain, respectively 19% and 17% of hydrogen by weight. U.S. Pat. No. 4,468,263 and U.S. Pat. No. 4,157,927 describe how mixtures containing these compounds together with ammonium nitrate $NH_4NO_3$ and diammonium decaborane, $B_{10}H_{10}(NH_4)_2$, can be thermally decomposed to yield high purity hydrogen for use as a laser fuel. The decomposition is strongly exothermic and, once activated, produces sufficient heat to promote a self-sustaining reaction. Other hydrogen generating mixtures include those of ammonium halides and alkali metal borohydrides, for example $NH_4Cl$+$LiBH_4$.

Activation may be assisted by the use of an additional chemical heat source such as, for example, a mixture of iron powder and $KClO_4$, or $TiH_2$ and $KClO_4$. Other chemical heat sources could also be used to effect the decomposition of the hydrogen generating compounds: examples could include $MnO_2$+$LiAlH_4$, Ni+Al, Zr+$PbCrO_4$, $Fe_2O_3$+Al, $LiAlH_4$+$NH_4Cl$. Advantageously, the selected heat source will also contribute to the hydrogen yield.

Pellets with two discrete layers may be used. In a preferred pellet formulation having two stacked layers, the larger upper layer comprises ammonia borane, which is the source of hydrogen, and the second smaller layer comprises a pure heat generating mixture of potassium chlorate, $KClO_4$ and iron powder. The second layer is ignited by the igniter and the heat so generated causes the first layer to thermally decompose, liberating hydrogen.

The hydrogen gas evolved is directed to the centre of the pressure vessel by the channels 15 in the gas handling layer 6. The gas then passes through a filter 4 to remove any impurities and particulates and is supplied to external equipment via a regulator 5. In this example a pressure transducer 11 is used to determine the pressure of hydrogen within the system. The output from the transducer is used to trigger the activation of further igniters in order to produce more hydrogen gas. This may be to maintain the pressure in the system or in response to demand from external equipment. Alternatively, the activation of the igniters to produce hydrogen may be under the manual control of an operator via a push button or switch. The transducer may also be used as a safety mechanism prohibiting the initiation of further pellets if the gas pressure rises above a set limit. Similarly, a temperature probe 12 is used to prohibit the initiation of further pellets if the temperature within the system rises above a safe limit.

The hydrogen source described in this example has a diameter of 110 mm and is 200 mm high. When fully charged with 12 pellets in each of 6 hydrogen generating elements the source weighs ca. 630 g. This provides sufficient hydrogen to operate a 50W fuel cell system for over 10 hours. Due to its compact size and low weight the hydrogen source is ideally suited to man portable applications. However, the pressure vessel can be designed to fit any space envelope. For example, a square reactor could be used if this was desirable to improve packing.

Figure 4:
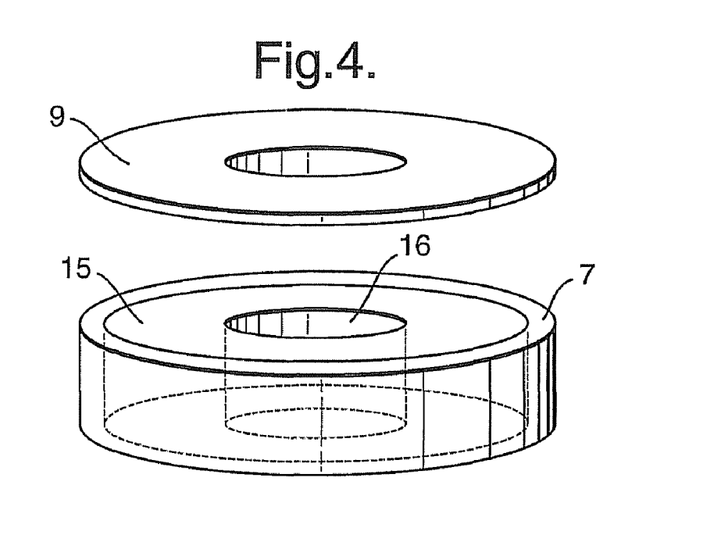
FIG. 4 shows an alternative hydrogen generating element for use in a source according to the present invention.
Figure 5:
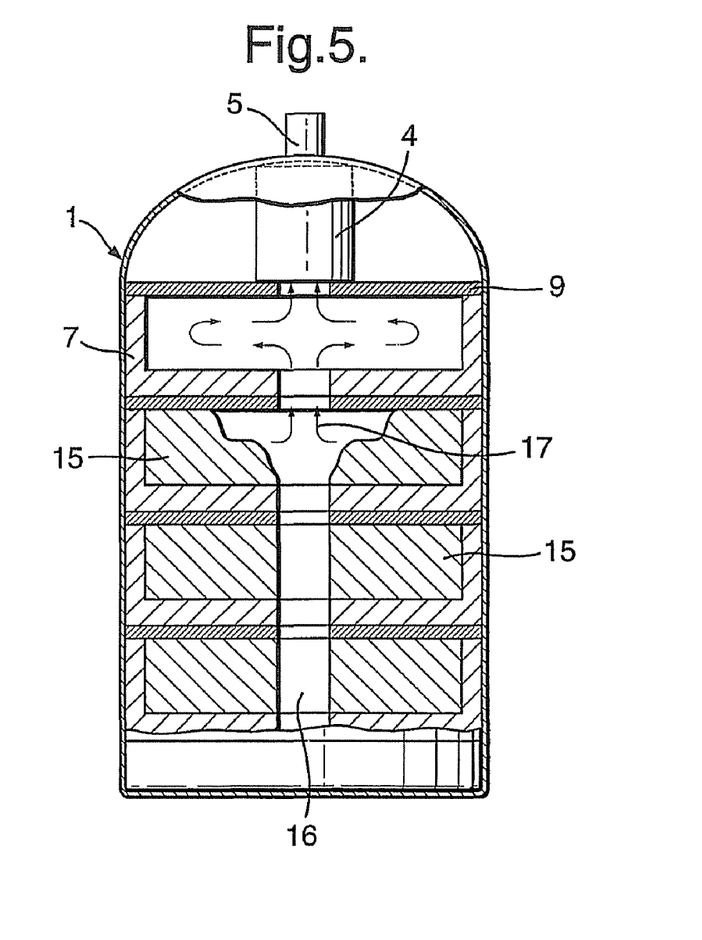
FIG. 5 shows a cross section of an alternative example of a hydrogen source incorporating the hydrogen generating elements of FIG. 4.

An alternative design for a hydrogen source according to the present invention is shown in FIGS. 4 and 5. In this design, a single pellet 15 is contained in a recess of a pellet holder 7. The pellet and holder are annular with a central hole. There is a thermal insulation layer 9, but, in this example, no gas handling layer. A gas handling layer may however be incorporated if required. In FIG. 5, four pellet holders are stacked in a pressure vessel 1 so that the central holes form a channel 16. The evolved hydrogen flows to the filter 4 and regulator 5 through the central channel 16 as indicated by the arrows 17. In FIG. 5 the uppermost pellet has been activated and is fully decomposed, the pellet below this is shown partially decomposed. Pellet ignition is achieved in the same way as for the source described above.

In certain arrangements the pellet holder may merely comprise the walls of the pressure vessel and any support surfaces in contact therewith.

Figure 6:
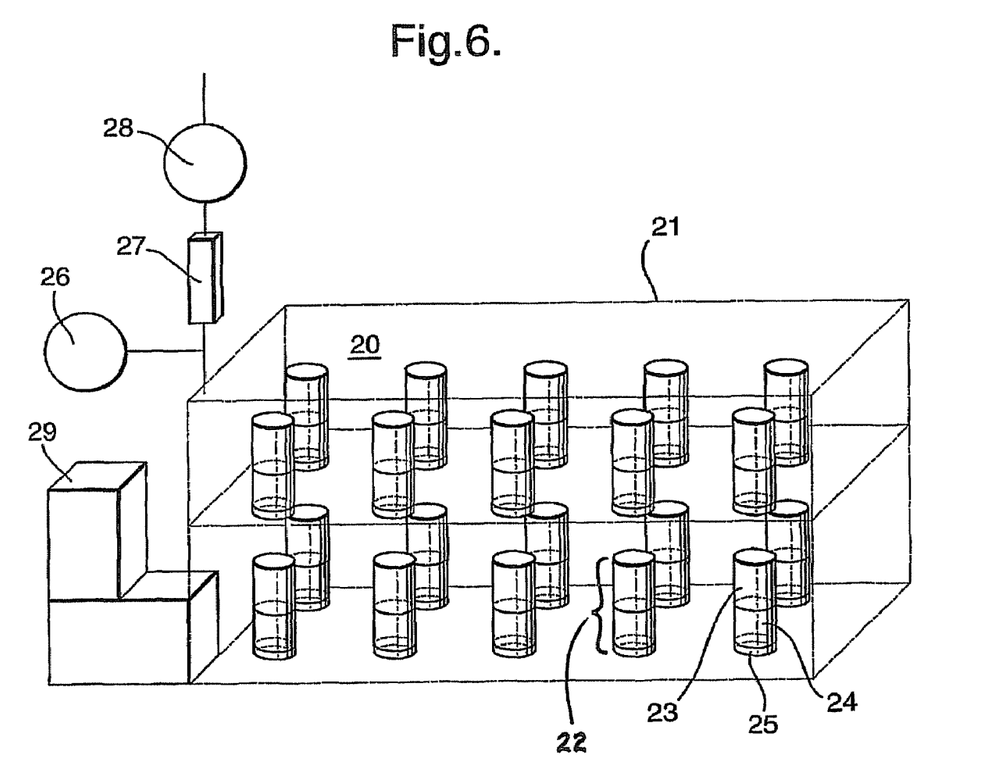
FIG. 6 shows a schematic representation of a reactor for larger scale hydrogen generation.

Although primarily aimed at small scale hydrogen generation, the hydrogen source could be used for larger scale hydrogen generation. FIG. 6 shows one design of a larger reactor 20 that could be used to provide greater amounts of hydrogen on demand. The arrangement of bilayer pellets 22, stacked one on top of another, in a pressure container 21 is shown schematically. The pellets 22 each comprise an upper layer 23 of ammonia borane and a lower layer 24 of a heat generating mixture, the latter being disposed over a separate igniter (resistance wire) 25. A pressure transducer 26, filter 27, pressure reducing valve 28 and control electronics 29 are also represented schematically. Such a reactor could be used in transport applications or for emergency stationary power.

Figure 7A:
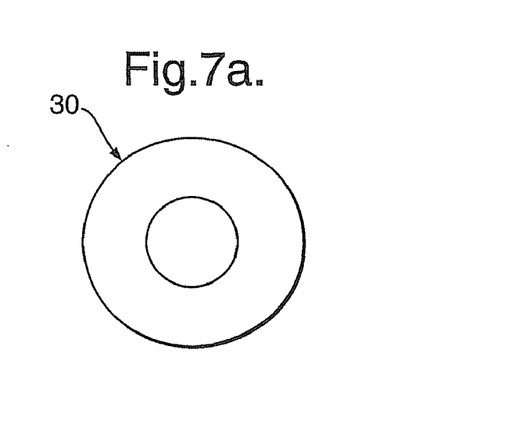
FIGS. 7a and 7b, respectively, show a top view and side view of a bilayer pellet of a doughnut configuration.
Figure 7B:
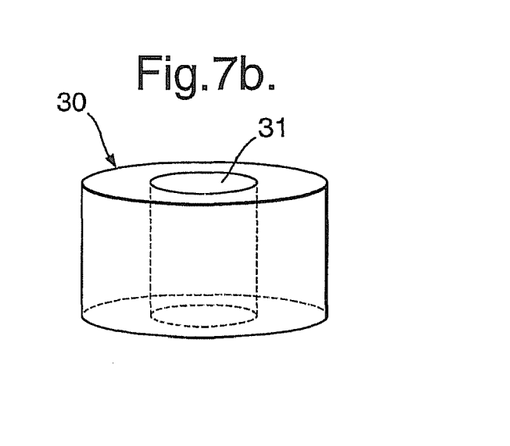
Figure 8A:
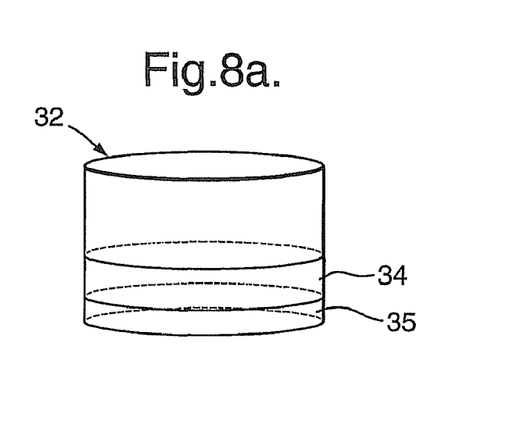
FIGS. 8a and 8b, respectively, show side views of a trilayer pellet and a bilayer pellet, each having a stacked configuration.
Figure 8B:
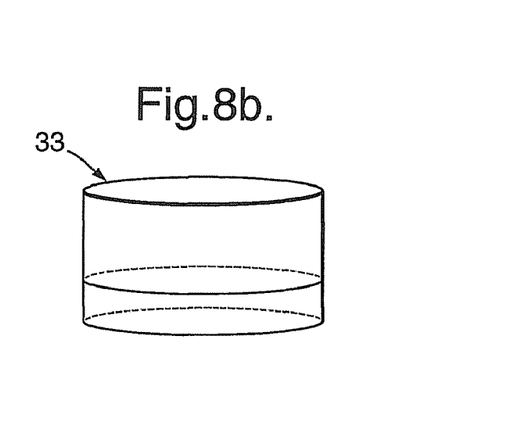

Various pellet configurations may be adopted, depending on the composition of the hydrogen generating mixture, the amount of heat generating mixture required (if any) and the shape of the pressure vessel. FIGS. 7a and 7b show a top view and side view of an alternative bilayer pellet 30 having a doughnut configuration, where the heat generating mixture 31 is disposed in a central cylindrical region. FIGS. 8a and 8b, respectively, depict side views of a trilayer pellet 32 and a bilayer pellet 33, each having a stacked configuration. In the trilayer pellet, a hydrogen generating mixture is provided as a layer above a central layer 34 of a hydrogen and heat generating mixture, which layer is provided above a layer 35 of a pure heat generating mixture.

In the following examples, various pellet compositions were subjected to thermal decomposition and the results assessed.

EXAMPLE 1

Figure 9:
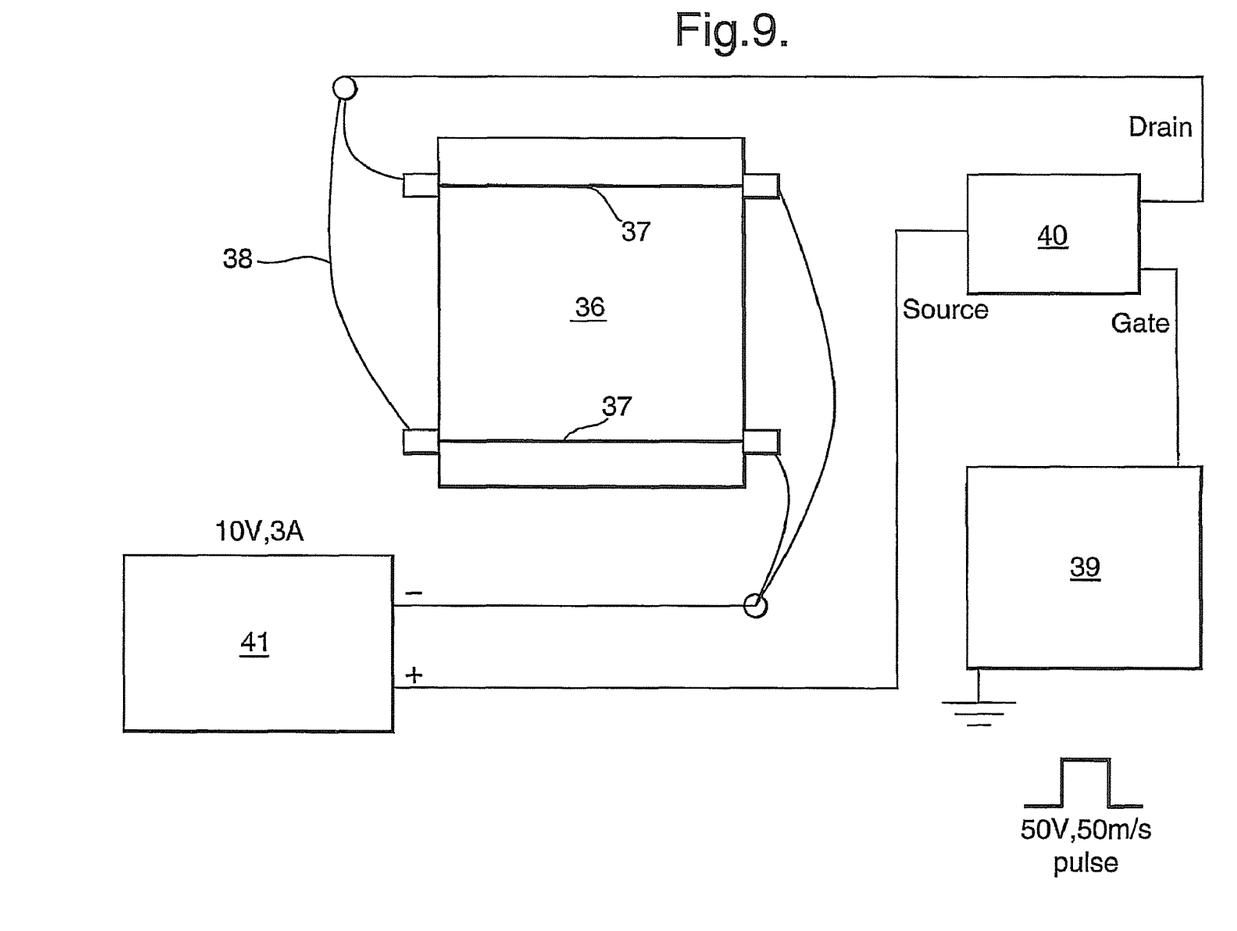
FIG. 9 is a schematic representation of an experimental circuit for testing pellet decomposition.

Single cell tests were performed to assess the yields which could be obtained from the thermal decomposition of ammonia borane, in order to determine the optimum ratio of heat mixture to ammonia borane for a given pellet size and configuration. FIG. 9 is a schematic representation of the experimental circuit used for testing pellet decomposition.

Each cell contains an ammonia borane (90% Aldrich) pellet 36 and one or two heat pellets 37 depending on the type of arrangement. The heat pellet consisting of 86% iron & 14% potassium perchlorate is ignited by a resistive heating wire 38 that is placed at either one end or at each end of the cell, sandwiched between the pellets. The spiral shaped wires used in this example (which could be of any shape or configuration) are manufactured from stainless steel or any suitable high resistive material.

Experimentally, to decompose a quantity of ammonia borane in a prototype single cell reactor a 5V, 50 ms square pulse is delivered from a signal generator to the gate of a MOSFET transistor or solid state relay which in turn switches a power supply for the given time period delivering a 10V, 3 A pulse. The current pulse is sufficient to electrically heat the wires, resulting in the ignition of the heat compound releasing heat to thermally decompose the ammonia borane to produce hydrogen gas.

The theoretical maximum hydrogen yield which could be obtained from ammonia borane is 19.6% by weight as shown by the equation below.

$$NH_3BH_3 \rightarrow BN + 3H_2$$

In this example, the best hydrogen yield was of 6.82% by weight (based on the total weight of ammonia borane and heat mix) for a 1:1 ratio for a given wt. of 0.50 g ammonia borane to 0.50 g of heat compound producing 0.830 liters of gas as a result of 69.59% decomposition of ammonia borane.

Figure 10:
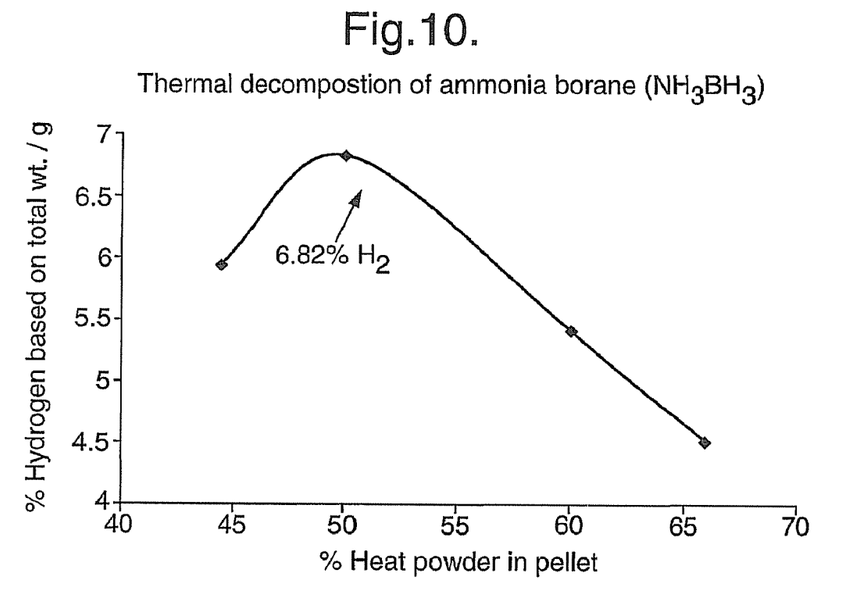
FIG. 10 is a graph showing hydrogen yield as a function of pellet composition for a pellet containing ammonia borane and a heat generating mixture; and, FIG. 11 is a graph showing hydrogen yield as a function of pellet composition for a pellet containing ammonia borane and a heat generating mixture that also liberates hydrogen.

The results of tests where the amount of heat pellet was varied are summarized in Table 1 below, and also graphically in FIG. 10.

TABLE 1

| Wt. Of $NH_3BH_3$/g | Wt. of Heat Pellet/g | % of whole pellet, which is heat powder: | % $H_2$ based on $NH_3BH_3$ only | % decomposition of $NH_3BH_3$ | % overall $H_2$ yield (whole pellet) |
|---|---|---|---|---|---|
| 0.50 | 1.0 | 66 | 13.49 | 68.8 | 4.50 |
| 0.50 | 0.75 | 60 | 13.49 | 68.8 | 5.40 |
| 0.50 | 0.50 | 50 | 13.64 | 69.59 | 6.82 |
| 0.50 | 0.40 | 44.4 | 10.68 | 54.48 | 5.93 |

EXAMPLE 2

A bilayer pellet of a different composition was tested. The heat powder used in this experiment was a 1:1 molar mix of lithium aluminium hydride and ammonium chloride. In addition to generating heat this mix also liberates hydrogen and it was hoped that this would increase the hydrogen yield of the total system further. The first and lowermost layer of the pellet contained 0.5 g of the heat mix ($LiAlH_4 + NH_4Cl$) and the second upper layer 0.5 g of ammonia borane. This pellet was decomposed using a heat resistance wire through which was passed a current pulse of 10 V, 3 A for 50 ms. The hydrogen yield was 1.05 L, 0.086 g $H_2$. This equates to a 8.6% hydrogen by weight based on the weight of the total pellet.

EXAMPLE 3

Figure 11:
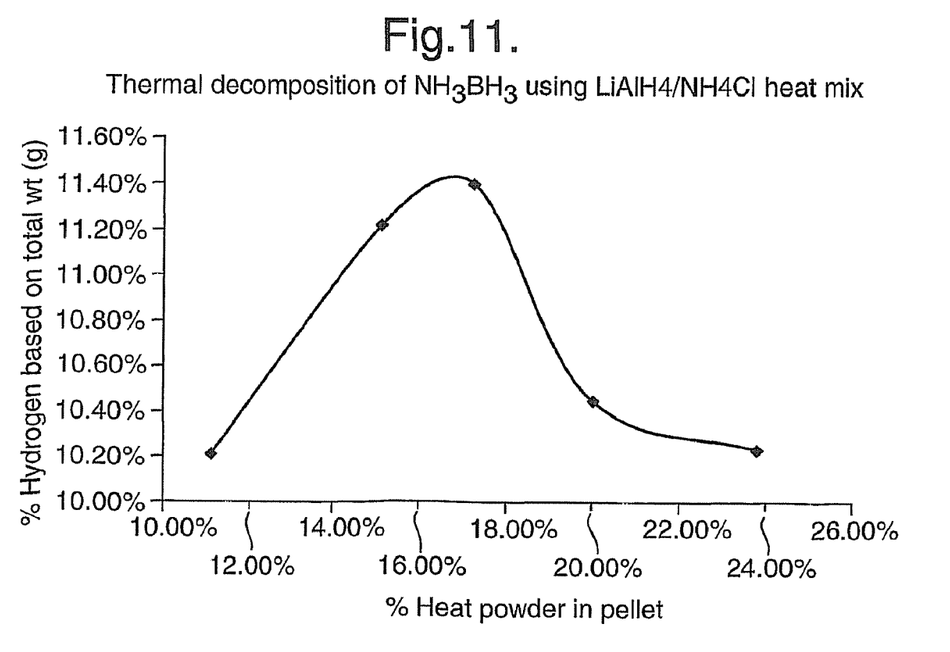

In this example bilayer pellets containing the same components as Example 2, but formulated in differing proportions, were formulated and tested. The results of tests where the amount of ammonia borane were varied are summarized in Table 2 below and graphically in FIG. 11.

In one pellet the first layer contained 0.125 g of the heat mix ($LiAlH_4 + NH_4Cl$) and the second upper layer 0.6 g of ammonia borane. This pellet was decomposed using a heat resistance wire through which was passed a current pulse of 10 V, 3 A for 3s. The hydrogen yield was 1.0 L, 0.082 g $H_2$. This equates to a yield of 11.4% hydrogen by weight based on the weight of the total pellet.

TABLE 2

| Wt. of LiAlH4/NH4Cl/g | Wt. of NH3BH3/g | % of whole pellet, which is heat powder: | % H$_2$ based on NH3BH3 only | % overall H$_2$ yield (whole pellet) | Vol H2/L |
|---|---|---|---|---|---|
| 0.125 | 1 | 11.11% | 11.48% | 10.21% | 1.39 |
| 0.125 | 0.7 | 15.15% | 13.22% | 11.22% | 1.12 |
| 0.125 | 0.6 | 17.24% | 13.77% | 11.40% | 1 |
| 0.125 | 0.5 | 20.00% | 13.05% | 10.44% | 0.79 |
| 0.125 | 0.4 | 23.81% | 13.42% | 10.23% | 0.65 |

What the invention claims is:

1. A hydrogen source comprising one or more hydrogen generating elements arranged in a pressure vessel and an ignition control system associated with the hydrogen generating element(s), wherein the one or more hydrogen generating elements comprise a plurality of pellets of an ignitable chemical mixture that on thermal decomposition evolve hydrogen gas, wherein the ignition control system comprises a plurality of ignitors arranged to ignite the pellets on an individual basis, and wherein the ignition control system is arranged to control the rate of ignition of the pellets.

2. A hydrogen source according to claim 1, wherein the hydrogen source is man portable.

3. A hydrogen source according to claim 1, wherein thermal insulation is provided within the pressure vessel to reduce heat transfer from the one or more hydrogen generating elements.

4. A hydrogen source according to claim 1, further comprising a regulator to control the flow of evolved hydrogen out from the pressure vessel.

5. A hydrogen source according to claim 4, wherein the regulator is integrated within the pressure vessel.

6. A hydrogen source according to claim 1, further comprising a filter to purify the evolved hydrogen.

7. A hydrogen source according to claim 6, wherein the filter is integrated within the pressure vessel.

8. A hydrogen source according to claim 6, wherein the filter is one of an activated carbon filter, a porous stainless steel filter or a sintered metal filter.

9. A hydrogen source according to claim 1, wherein the or each hydrogen generating element comprises a pellet holder provided with one or more recesses.

10. A hydrogen source according to claim 9, wherein the pellet holder comprises a rigid, porous material.

11. A hydrogen source according to claim 1, wherein at least one hydrogen generating element further comprises a gas handling layer provided with channels arranged to direct the flow of evolved hydrogen.

12. A hydrogen source according to claim 11, wherein the gas handling layer comprises a metallic layer arranged to contact the inner surface of the pressure vessel, thereby conducting heat to the exterior.

13. A hydrogen source according to claim 3, wherein the thermal insulation comprises one or more of a felt layer, a ceramic, asbestos or rockwool.

14. A hydrogen source according to claim 1, wherein the one or more ignitors comprise heated resistance wires or pyrotechnic ignitors.

15. A hydrogen source according to claim 1, wherein the ignitors are placed in contact with the pellets.

16. A hydrogen source according to claim 1, wherein the ignition control system comprises activation means to activate the ignitors, which means are selected from a battery, an electrochemical cell, a fuel cell, capacitor or a power supply.

17. A hydrogen source according to claim 1, wherein the ignition control system further comprises a pressure transducer to determine the pressure of hydrogen within the pressure vessel.

18. A hydrogen source according to claim 17, wherein the output from the pressure transducer is used to trigger the decomposition of the pellets in order to maintain the pressure of hydrogen at a pre-set level or in response to demand from external equipment.

19. A hydrogen source according to claim 17, wherein the ignition control system is arranged so that it does not activate the ignitors when the output from the pressure transducer indicates that the pressure within the pressure vessel is above a safe limit.

20. A hydrogen source according to claim 1, wherein the ignition control system further comprises a temperature probe to determine the temperature within the pressure vessel.

21. A hydrogen source according to claim 20, wherein the ignition control system is arranged so that it does not activate the ignitors when the output from the temperature probe indicates that the temperature within the pressure vessel is above a safe limit.

22. A hydrogen source according to claim 1, wherein the pressure vessel is adapted to be rechargeable with replacement pellets for re-use.

23. Portable equipment comprising a hydrogen source according to claim 1.

24. Equipment according to claim 23, in the form of a fuel cell system.

25. A hydrogen source comprising one or more hydrogen generating elements arranged in a pressure vessel and an ignition control system associated with the hydrogen generating element(s), wherein the one or more hydrogen generating elements comprise a plurality of pellets of an ignitable chemical mixture that on thermal decomposition evolve hydrogen gas, wherein the ignition control system is arranged to control the rate of ignition of the pellets, and wherein the ignition control system comprises a plurality of ignitors, one or more ignitors being associated with each individual pellet to permit successive or simultaneous ignition of pellets in a controllable manner.

26. A hydrogen source comprising one or more hydrogen generating elements arranged in a pressure vessel and an ignition control system associated with the hydrogen generating element(s), wherein the one or more hydrogen generating elements comprise a plurality of pellets of an ignitable chemical mixture that on thermal decomposition evolve hydrogen gas, wherein the ignition control system comprises a plurality of ignitors arranged to ignite the pellets on an individual basis and the pellets are sufficiently spaced or separated from one another to prevent cross-ignition, and wherein the ignition control system is arranged to control the rate of ignition of the pellets.

* * * * *